United States Patent
Dangel et al.

(10) Patent No.: US 8,873,912 B2
(45) Date of Patent: Oct. 28, 2014

(54) OPTICAL WAVEGUIDE WITH EMBEDDED LIGHT-REFLECTING FEATURE AND METHOD FOR FABRICATING THE SAME

(75) Inventors: Roger F. Dangel, Rueschlikon (CH); Folkert Horst, Rueschlikon (CH); Tobias P. Lamprecht, Berneck (CH); Bert J. Offrein, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 13/263,045

(22) PCT Filed: Mar. 31, 2010

(86) PCT No.: PCT/IB2010/051397
§ 371 (c)(1),
(2), (4) Date: Oct. 5, 2011

(87) PCT Pub. No.: WO2010/116291
PCT Pub. Date: Oct. 14, 2010

(65) Prior Publication Data
US 2012/0039576 A1  Feb. 16, 2012

(30) Foreign Application Priority Data
Apr. 8, 2009  (EP) .................................... 09157654

(51) Int. Cl.
| | |
|---|---|
| *G02B 6/10* | (2006.01) |
| *G02B 6/125* | (2006.01) |
| *G02B 6/42* | (2006.01) |
| *G02B 6/138* | (2006.01) |
| *G02B 6/12* | (2006.01) |

(52) U.S. Cl.
CPC .. *G02B 6/12002* (2013.01); *G02B 2006/12104* (2013.01); *G02B 6/125* (2013.01); *G02B 6/4224* (2013.01); *G02B 6/138* (2013.01)
USPC ................ 385/52; 385/14; 385/131; 385/132

(58) Field of Classification Search
USPC ....................................... 385/14, 52, 129–132
See application file for complete search history.

(56) References Cited

U.S. PATENT DOCUMENTS

| | | | |
|---|---|---|---|
| 4,448,804 | A | 5/1984 | Amelio et al. |
| 4,701,351 | A | 10/1987 | Jackson |

(Continued)

FOREIGN PATENT DOCUMENTS

| | | |
|---|---|---|
| EP | 1120672 A1 | 8/2001 |
| EP | 1291692 A1 | 3/2003 |

(Continued)

OTHER PUBLICATIONS

International Search Report; International Application No. PCT/IB2010/051397; International Filing Date: Mar. 31, 2010; 6 pages.

(Continued)

*Primary Examiner* — Daniel Petkovsek
(74) *Attorney, Agent, or Firm* — Cantor Colburn LLP (57) ABSTRACT

A method for fabricating an optical waveguide includes setting, on a lower cladding of an optical waveguide, a light-reflecting feature and at least one waveguide core distinct from the reflecting feature. An upper cladding is applied that embeds both the light-reflecting feature and the waveguide core.

15 Claims, 8 Drawing Sheets

(56) References Cited

U.S. PATENT DOCUMENTS

| | | | |
|---|---|---|---|
| 4,948,707 A | 8/1990 | Johnson et al. | |
| 5,153,023 A | 10/1992 | Orlowski et al. | |
| 5,264,288 A | 11/1993 | Das et al. | |
| 5,405,656 A | 4/1995 | Ishikawa et al. | |
| 5,446,814 A * | 8/1995 | Kuo et al. | 385/31 |
| 5,761,350 A * | 6/1998 | Koh | 385/14 |
| 5,985,785 A | 11/1999 | Lane et al. | |
| 6,086,946 A | 7/2000 | Ballard et al. | |
| 6,344,242 B1 | 2/2002 | Stolk et al. | |
| 6,621,961 B2 * | 9/2003 | Alibert | 385/52 |
| 6,640,021 B2 * | 10/2003 | Pogge et al. | 385/14 |
| 6,741,781 B2 * | 5/2004 | Furuyama | 385/129 |
| 6,744,953 B2 * | 6/2004 | Lemoff et al. | 385/52 |
| 6,900,126 B2 | 5/2005 | Carter et al. | |
| 7,212,698 B2 | 5/2007 | Bapst et al. | |
| 7,212,713 B2 * | 5/2007 | Fukuzawa et al. | 385/50 |
| 7,382,954 B1 | 6/2008 | Dangel et al. | |
| 7,389,015 B1 | 6/2008 | Lamprecht et al. | |
| 7,680,367 B2 * | 3/2010 | Matsuoka et al. | 385/14 |
| 7,949,212 B2 * | 5/2011 | Gomyo | 385/28 |
| 2004/0037487 A1 * | 2/2004 | Nakaya et al. | 385/14 |
| 2006/0204176 A1 | 9/2006 | Kobayashi | |

FOREIGN PATENT DOCUMENTS

| | | |
|---|---|---|
| EP | 1715368 A1 | 10/2006 |
| EP | 1816498 A1 | 8/2007 |
| JP | 2005164801 A | 6/2005 |
| JP | 2006038958 A | 2/2006 |
| JP | 2007093747 A | 4/2007 |

OTHER PUBLICATIONS

R. Dangel et al., "Polymer-Waveguide-Based Board-Level Optical Interconnect Technology for Datacom Applications," IEEE Transactions on Advanced Packaging; vol. 31; Issue 4; pp. 759-767; 2008.

Jurgen Van Erps et al., "Fabrication of Multimode Polymer Waveguides with Integrated Micro-Mirrors Using Deep Lithography with Protons," Proceedings Symposium IEEE/LEOS Benelux Chapter; pp. 87-90; 2004.

Nina Hendrickx et al., "Laser Ablation and Laser Direct Writing as Enabling Technologies for the Definition of Micro-Optical Elements," Integrated Optics: Theory and Applications; Proc. of SPIE; vol. 5956, 10 pages; 2005.

J.A. Kash et al., "Chip-to-Chip Optical Interconnects," Optical Society of America; 3 pages; 2005.

T. Lamprecht et al., "Passive Alignment of Optical Elements in a Printed Circuit Board," Electronic Components and Technology Conference, IEEE; pp. 761-767; 2006.

Aongus McCarthy et al., "Fabrication and Characterisation of Direct Laser-Written Multimode Polymer Waveguides with Out-of-Plane Turning Mirrors," Conference on Lasers and Electro-Optics Europe; IEEE; 2005.

R.A. Farrer et al., "Selective Functionalization of 3-D Polymer Microstructures," J. Am. Chem. Soc.; 128; pp. 1796-1797; 2006.

Written Opinion; International Application No. PCT/IB2010/051397; International Filing Date: Mar. 31, 2010; 8 pages.

\* cited by examiner

OPTICAL WAVEGUIDE WITH EMBEDDED LIGHT-REFLECTING FEATURE AND METHOD FOR FABRICATING THE SAME

PRIORITY

This is a U.S. national stage of application No. PCT/IB2010/051397, filed on 31 Mar. 2010. Priority under 35 U.S.C. §119(a) and 35 U.S.C. §365(b) is claimed from European Patent Application No. 09157654.6, filed 8 Apr. 2009, and all the benefits accruing therefrom under 35 U.S.C. §119, the contents of which in its entirety are herein incorporated by reference.

BACKGROUND

The disclosure relates generally to the field of optical waveguides, such as polymer waveguides. In particular, it concerns an optical waveguide having light-reflecting features such as micro-mirrors.

Optical waveguides, such as polymer optical waveguides, wherein channels are designed to confine and guide an optical signal, are known in the art. Such waveguides may, for instance, be used in the field of optical interconnects, where polymer channels are integrated in layers of printed circuit boards (PCBs). In these interconnects, data are carried by optical signals guided by the polymer waveguide channels.

The confinement of the light in the polymer waveguide channel is known to arise due to a difference between the refractive indices of the channel core and the cladding material, the latter having the lower refractive index. For PCB applications, the polymer waveguide channels may be produced using polymer layer deposition techniques and UV-light exposure for the waveguide core patterning.

In general, the layer-based manufacturing technique used naturally restricts the waveguide routing to a single plane. Even though several waveguide planes can be stacked, they cannot easily be optically connected. Furthermore, the optical properties of the polymer waveguides, e.g., the small refractive index difference between the waveguide core and cladding, require large bending radii of the waveguide channels to avoid excess bending losses. The resulting area demand causes complications for certain routing schemes.

In this respect and for the sake of exemplification, US 2006/0204176 discloses methods for optical routing, which rely on mirrors. As another example, EP 1 715 368 suggests using optical elements, e.g. mirrors, which are positioned within the optical layer during their fabrication process.

A number of papers are further devoted to the subject, such as for example:

"Laser Ablation and Laser Direct Writing as Enabling Technologies for the Definition of Micro-Optical Elements" Nina Hendrickx, Proc. of SPIE Vol. 5956 59561B-5. Here, micro-mirrors are defined as a "hole," by laser ablation, in the optical layer such as to provide out-of-plane coupling. The mirror effect is obtained due to internal reflection that occurs at the polymer-air interface.

"Chip-to-chip optical interconnects" Kash, J. A, Optical Fiber Communication Conference, 2006 and the 2006 National Fiber Optic Engineers Conference. OFC 2006, ISBN: 1-55752-803-9.

"Fabrication and Characterisation of Direct Laser-Written Multimode Polymer Waveguides with Out-of-Plane Turning Mirrors" A. McCarthy, CLEO05.

"Fabrication of multimode polymer waveguides with integrated micro-mirrors using Deep Lithography with Protons" J. Van Erps, Proceedings Symposium IEEE/LEOS Benelux Chapter, 2004, Ghent.

In addition, another major challenge is the integration of optical, optoelectronic (VCSEL, photodiode) or optomechanical (connector) elements with polymer waveguides. Precise alignment in the range of micrometers is required to maximize the optical power coupled between the optical waveguide and the other element. For example, "active" alignment methods are known wherein, after positioning an element, the optical power is monitored and the position of the element is adjusted until optimum optical power is achieved.

In contrast, "passive" methods are also known, which merely involve a single placement step, whereby an element automatically homes close to an optimum position. Such a method is, for instance, described in U.S. Pat. No. 7,382,954 and U.S. Pat. No. 7,389,015. These approaches make use of specific structures in a metal layer (e.g., copper layer) of a PCB board.

Other methods are described in, for example:

U.S. Pat. No. 7,212,698 (passive alignment method);

Lamprecht, et al., "Passive Alignment of Optical Elements in a Printed Circuit Board", Proceedings ECTC'06, pp. 761-767;

Dangel, et al., "Polymer-Waveguide-Based Board-Level Optical Interconnect Technology for Datacom Applications", invited paper in EPEP/SPI (Electrical Performance of Electronic Packaging/Signal Propagation on Interconnects) Special Section of IEEE Transactions on Advanced Packaging, November 2008.

BRIEF SUMMARY

According to one aspect, the present disclosure is embodied as a method for fabricating an optical waveguide, including: providing a lower cladding of optical waveguide; setting, on the lower cladding, a light-reflecting feature and at least one waveguide core distinct from the reflecting feature; and applying an upper cladding embedding both the light-reflecting feature and the waveguide core.

A method and a waveguide embodying the present disclosure will now be described, by way of non-limiting example, and in reference to the accompanying drawings.

DETAILED DESCRIPTION

As an introduction to the following description, it is first pointed out that a general aspect of the disclosure is directed to a method for fabricating an optical waveguide (e.g. a polymer optical waveguide). Basically, it is a layer-by-layer technique. Both the waveguide cores and light-reflecting features (such as mirrors or markers) are set onto the lower cladding, before actually applying the upper cladding. Accordingly, a core layer is provided which comprises the waveguide cores and the distinct reflecting features, both forming an open structure on the lower cladding. After applying the upper cladding, light-reflecting features and waveguide cores are embedded therein. Thus, the upper cladding applied fills the space left vacant by the open structures. Since the light reflecting features and waveguide cores can be set with high accuracy on the lower cladding (before applying the upper cladding), the problems of reworking (e.g. dicing) or refining the position of a light-reflecting feature inserted a posteriori is circumvented. More generally, the fabrication process is simplified, notably with respect to the use of inserts. Such a method allows for fabricating embedded mirrors and/or fiducial markers, which have respective advantageously applications to be described below.

In the following, detail aspects of two main embodiments shall be discussed.

A first embodiment is described in reference to FIGS. 1-10. Here, the light-reflecting feature may be an embedded marker, which allows for easy fabrication and subsequent alignment of the optical waveguide with external components. For the sake of exemplification, it shall therefore be referred to a marker rather than a light-reflecting feature. This does not, however, restrict the scope of the present disclosure to markers only, as most of the principles discussed in reference to, e.g., FIGS. 1-4 can be straightforwardly exported to the second embodiment, to be later described in reference to FIGS. 11-15.

Figure 1:
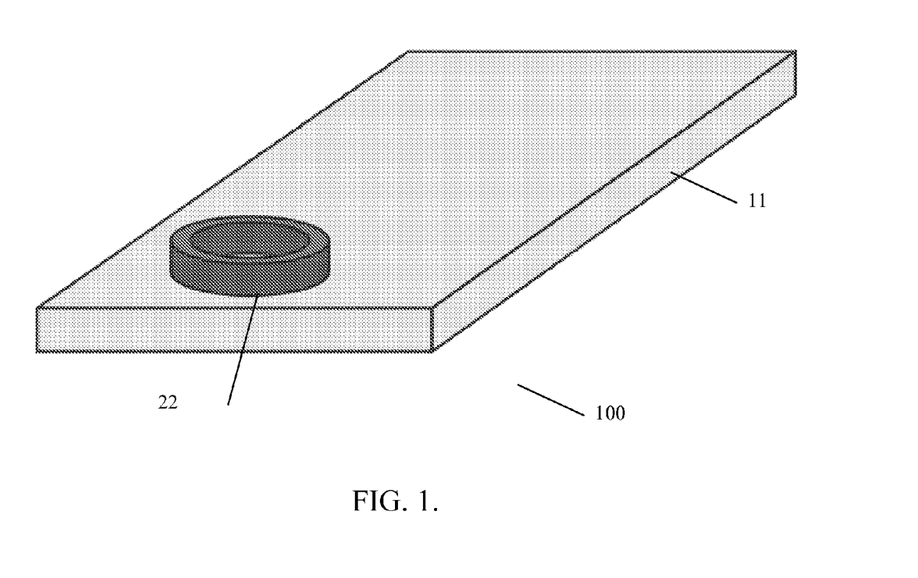
FIGS. 1-4 schematically depict a method for fabricating a polymer optical waveguide, according to an embodiment of the present disclosure.

First, in reference to FIG. 1, a lower cladding 11 of optical waveguide is provided. Material, composition, and fabrication of lower cladding for optical waveguides are known per se.

The fabrication of the core layer can then properly begin. Emphasis is put on the fact that "core layer" is not necessarily a filled layer but rather consists of open structures, as discussed above. In addition, the core layer to be fabricated includes at least one marker, i.e., a light-reflecting feature, and at least one waveguide (distinct from the marker), although it likely includes several of each in practice.

The core layer, as usual, is meant to be located on one side of the lower cladding, that is, "on" the lower cladding in the example of FIG. 1.

Several ways of fabricating the core layer features can be contemplated. For instance, one may first set the waveguide cores and then the markers. However, the fabrication of the core layer may preferably start with that of the marker, which is easier in practice, owing to the dimensions and shape thereof, with respect to the waveguide cores.

To do this, one may for instance apply a first polymerizable layer on the lower cladding and then pattern the applied layer such as to obtain a body 22 for the light-reflecting marker to be obtained in fine. The body 22 is accordingly an integral part of the current layer, at variance with an insert.

In further detail, starting on the lower cladding of the polymer waveguide, a layer of a specific photo-polymerizable polymer or monomer can be applied with a given thickness. For example, a UV laser direct writing system can be used to define the body structure 22 into this polymer layer. The polymer or monomer is preferably chosen such that the surface of the photo-polymerized polymer obtained provides specific chemical properties, as to be explained below.

Figure 2:
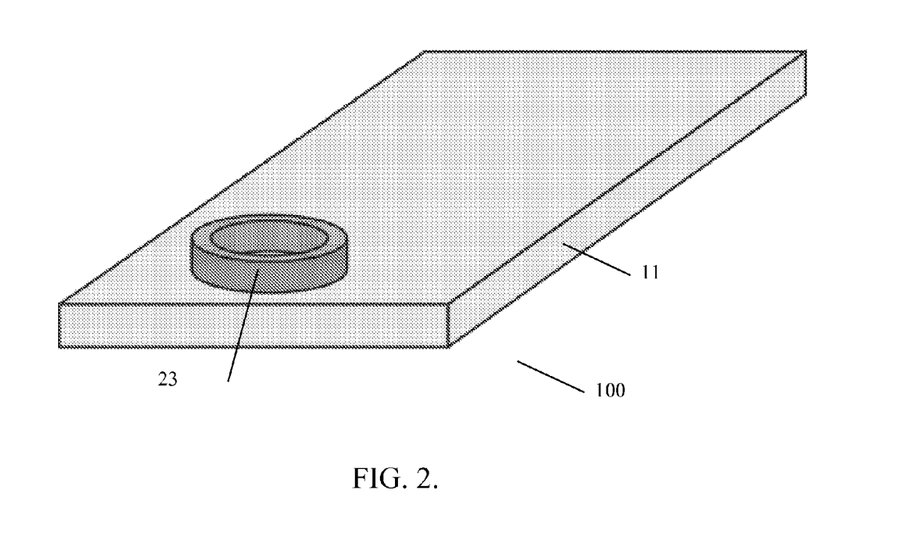

A light-reflecting layer may subsequently be fabricated, e.g. deposited on the patterned body, as illustrated in FIG. 2. A light-reflecting feature 23 is accordingly obtained within the core layer 21.

For example, the light-reflecting layer fabrication may advantageously be decomposed as a two-step process, namely:

(i) applying a pre-plate catalyst selectively on the body; and (ii) plating a metal which deposits on the selectively applied catalyst (e.g., electroless plating). Accordingly, the reflecting layer restricts to the desired area. Metallization provides light-reflecting characteristics to the said area.

Similarly, applying the pre-plate catalyst may be achieved in several steps. One may, e.g., first selectively activate the surface of the feature body by applying thereon selectivity-enabling molecules. Likely, the selectivity-enabling molecules bond with the patterned body surface and not with the lower cladding, at least not substantially, such that the body surface is selectively activated. Next, the pre-plate catalyst can be deposited on the desired surface, where the catalyst adsorbs via the selectivity-enabling molecules.

For example, the selective surface activation may use molecules containing amine-groups as reactive component, which react only with the surface of the polymer used for patterning the body 22 and typically not with the cladding material. Molecules may for example bond to a specific ligand group, e.g., an acrylate group, on the surface of the polymer. In this regard, ethylenediamine in hexanol can be used as molecule and solvent.

Next, as to the catalyst seed, a noble metal complex, e.g., Pd(II), dissolved in an aqueous solution with a pH value in the range of 2 to 7 can be used. The noble metal complex can thus be adsorbed by the free amine group of the molecule cited above, which is bonded to the surface of the body 22.

Finally, concerning the electroless plating, custom-made or commercially available electroless plating baths, e.g., of nickel, can be used to deposit a metal. The metal is likely deposited only were Pd(II) catalysts are present, that is, on the surface of the polymer body.

Note that, as a possible additional step, one may use a custom-made or commercially available immersion baths of gold, which can be used to deposit a second, thin metal layer onto the first metal layer. The second metal layer typically provides higher reflectivity, especially in the communication wavelength envisaged here, e.g., around 850 nm.

Interestingly, it is noted that light-reflecting markers as described above can be fabricated using merely the same equipment as used for the fabrication of the polymer waveguides on large scale substrates. Indeed, the use of electroless plating in PCB manufacturing is known, yet for other purpose.

The reflecting markers obtained likely have dimensions in the range of one waveguide core's section. Typically, the thickness of the upper cladding to be applied next shall be substantially larger than the thickness of the markers. Therefore, the said markers do not interfere with the subsequent fabrication process of the waveguide cores.

As a detailed example, the following can be adopted for the metallization process:

Substrate: FR4 (epoxy resin bonded, woven glass fabric)
Lower cladding: UV cured, optically transparent polymer (with refractive index $n_{clad}$);
Mirror base Mixture of mono- and multifunctional acrylate monomer,
polymer: oligomers, polymers with photoinitiator (e.g. TPO);
Patterning: UV laser exposure with subsequent development in cyclohexanone
Surface activation: (Aminolysis) ethylenediamine in hexanol>ethylenediamine bonds to acrylate group;

Catalyst seed: $Na_2Pd_2Cl_4$ in aqueous solution>Pd(II) is adsorbed on the amine group on the surface of the mirror polymer structure;

Electroless plating: Commercially available Ni plating bath;

Gold layer: Commercially available immersion gold bath;

Waveguide core: Optically transparent polymer (with refractive index $n_{core}$, $n_{core} > n_{clad}$) exposed with UV laser direct writing; and Upper cladding: UV cured, optically transparent polymer (with refractive index $n_{clad}$).

In addition, interesting variants concerning the electroless plating process can be found in the following references: U.S. Pat. No. 4,448,804, U.S. Pat. No. 4,701,351, U.S. Pat. No. 4,948,707, U.S. Pat. No. 5,153,023, U.S. Pat. No. 5,264,288, U.S. Pat. No. 5,405,656, U.S. Pat. No. 5,985,785, U.S. Pat. No. 6,086,946, U.S. Pat. No. 6,344,242, U.S. Pat. No. 6,900,126. In addition, other interesting details may be found in R. A. Farrer, et al., "Selective Functionalization of 3-D Polymer Microstructures", J. AM. CHEM. SOC. 2006, 128, 1796-1797.

Figure 3:
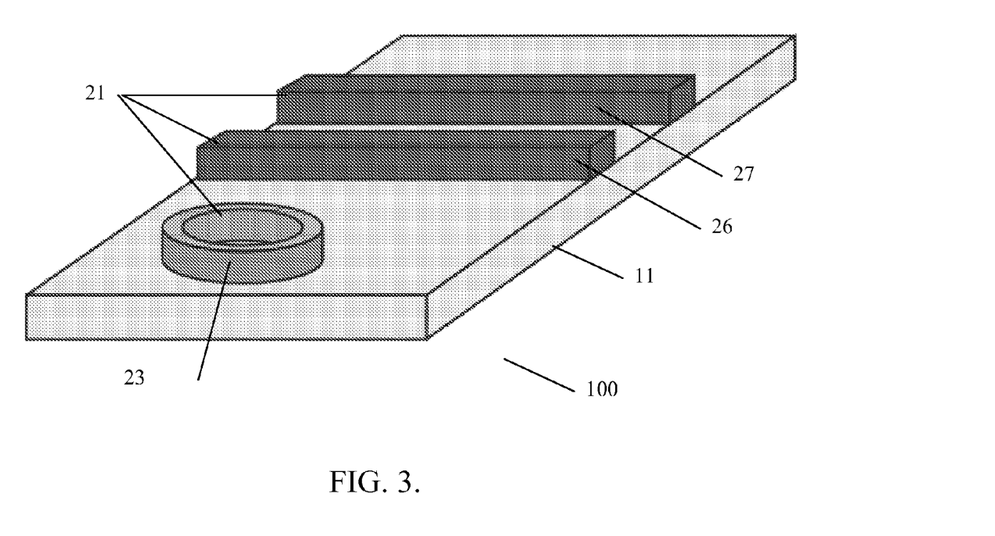

Next, in reference to FIG. 3, the fabrication of the core layer 21 further comprises setting the waveguide cores 26, 27 (or simply the "waveguides"), basically on the same level as the marker 23. This is what makes it possible to accurately know where waveguides 26, 27 are located.

To achieve this, another polymer layer can for instance be applied onto the lower cladding. If necessary, the (uncured) polymer layer used at the time of patterning the marker body 22 has likely been washed out during an intermediate development step.

Patterning the waveguides in the other polymerizable layer is carried out with respect to the patterned light-reflecting features, i.e., at a given distance therefrom. As evoked, owing to the dimensions of the markers, the disturbance of the polymer layer is negligible. A UV laser direct writing system, which likely has a vision system, is then used to locate a marker and write the waveguide patterns in accordance with the position of the located marker. Therefore, distortions in the polymer layer can be eliminated and the waveguides can locally be accurately aligned to the marker. After the development and optional curing step, the fabrication of the waveguide core pattern is completed.

Figure 4:
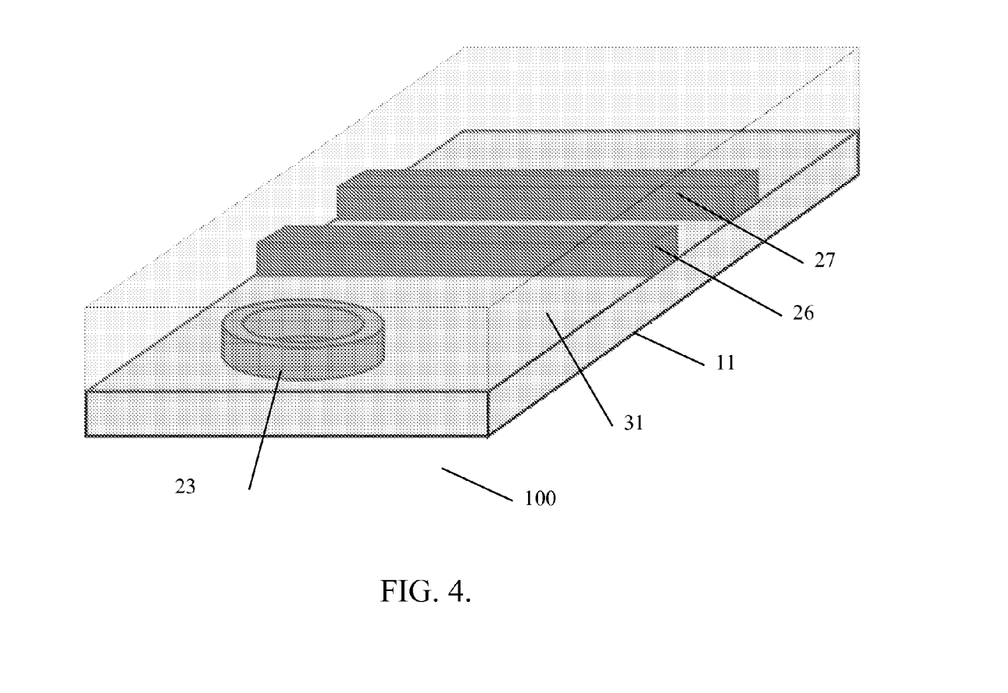

Finally, and as described earlier, an upper cladding polymer 31 can be applied such as to embed both the marker 23 and waveguides 26, 27, as shown in transparency in FIG. 4. For example, a layer of cladding polymer 31 is applied on top of the lower cladding 11, such that it the new layer 31 embeds the waveguide cores 26, 27 and the marker 23 completely. The layer 31 can then be conventionally processed to complete the fabrication of the polymer waveguide. No further work is required at this stage, as to the features embedded in the polymer waveguide. In particular, no post-processing fine design is needed for the embedded light-reflecting features.

Optionally, multilayer waveguides can be obtained by repeating the steps described above. Basically, the polymer waveguide obtained so far can be provided as a new lower cladding for a multilayer waveguide to be fabricated next. Then, the steps of setting waveguide cores and applying the upper cladding are repeated, such that a new upper cladding embeds additional waveguide cores. In a variant, the steps pertaining to the fabrication of the markers may be skipped, if only one or few markers are needed.

Now, as mentioned above, the light-reflecting feature may act be used as a marker, e.g., a "fiducial" marker for enabling subsequent alignment of the polymer waveguide obtained with an external component. Should a mechanical assembly step be contemplated therewith, the fiducial marker would accordingly have a convenient shape, such as the ring shape 22, 23 represented in FIGS. 1-10.

To achieve this, one needs to uncover the marker. Process steps to retrieve the embedded fiducial markers are thus now described in reference to FIGS. 5 and 6.

Figure 5:
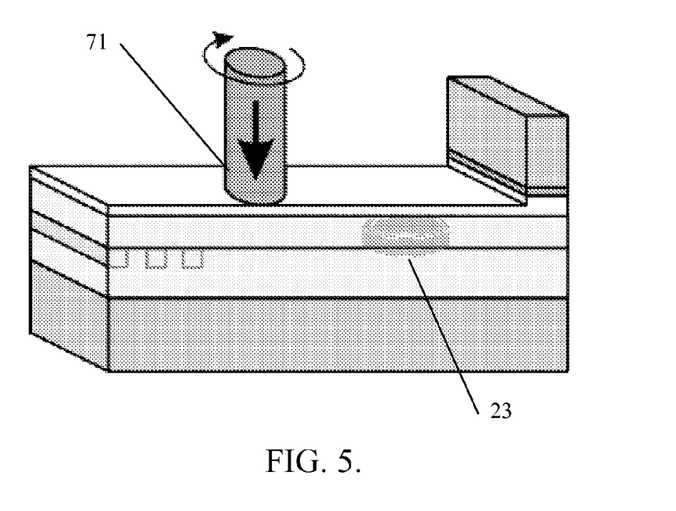
FIGS. 5-6 illustrate uncovering a marker in a waveguide obtained according to the embodiment of FIGS. 1-4.

First, if required, a top layer can be laminated onto the layer which contains the waveguides. Thus, a mechanical milling 71 may be necessary to remove the top layer, as depicted in FIG. 5. An additional metal plane could for instance be advantageously used in the top layer to act as an electrical drill stop such as to prevent from milling the markers or waveguide cores.

Next, a laser ablation 81 (FIG. 6) of the upper cladding may be relied upon in order to uncover the fiducial marker 23. For instance, a laser ablation process resembling the micro-via laser drilling in PCB manufacturing can be contemplated. Here, it is used to remove the cladding polymer on top (and material inside the marker, in case it has e.g. a ring shape).

Figure 6:
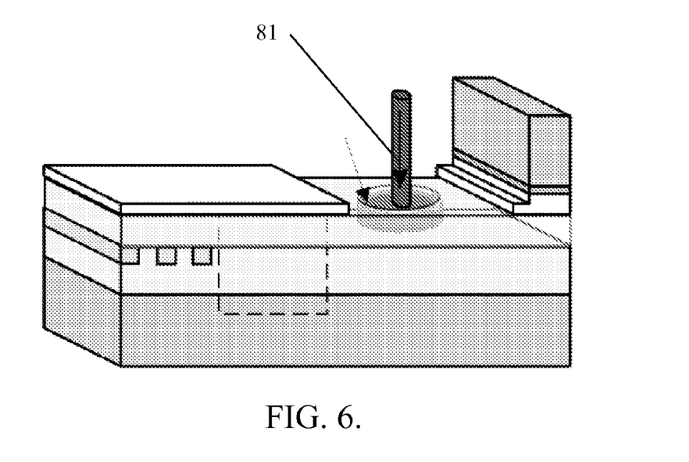

The laser beam 81 is likely to be reflected by the metal layer of the fiducial marker 23. Therefore, the fiducial marker shall merely remain intact.

The uncovered marker 23 can now act as a mechanical reference. During fabrication, the waveguides have been aligned to the marker. Therefore, the position of the waveguides 26, 27 is defined by the marker 23 with high accuracy.

In this respect, FIGS. 7-10 illustrate steps of alignment of the polymer waveguide with an external component, based on mechanical match of the fiducial marker with a counterpart of said external component.

Figures 7, 8:
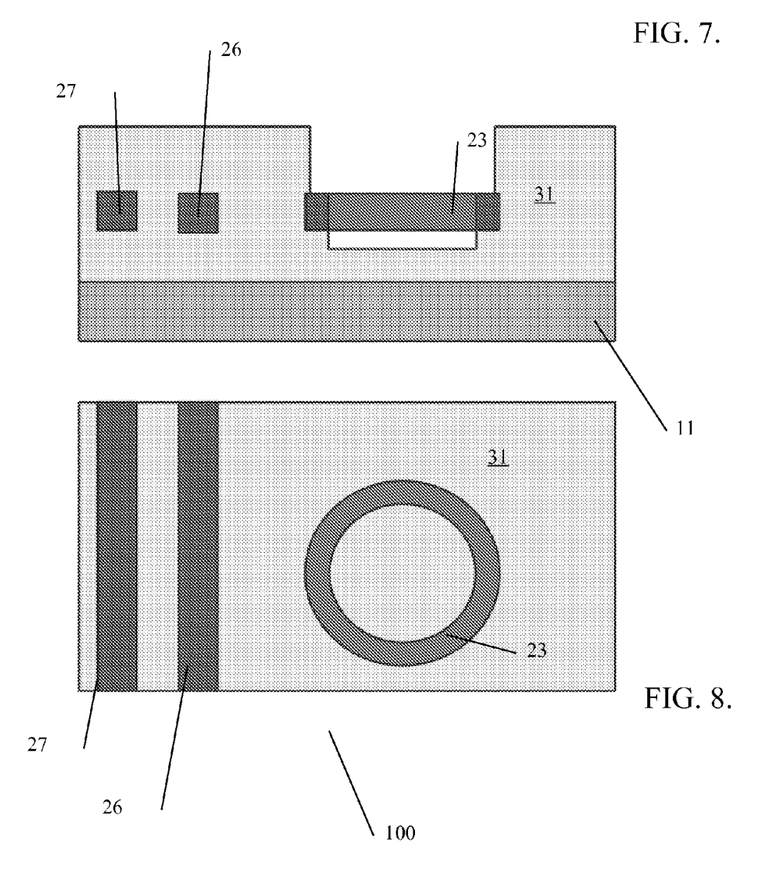
FIGS. 7-10 show alignment of a waveguide as obtained in FIGS. 1-6 with an external component.

In detail, FIG. 7 is a longitudinal section view of FIG. 4, yet after ablation as described in reference to FIGS. 5-6. FIG. 8 is the corresponding top view.

Figure 9:
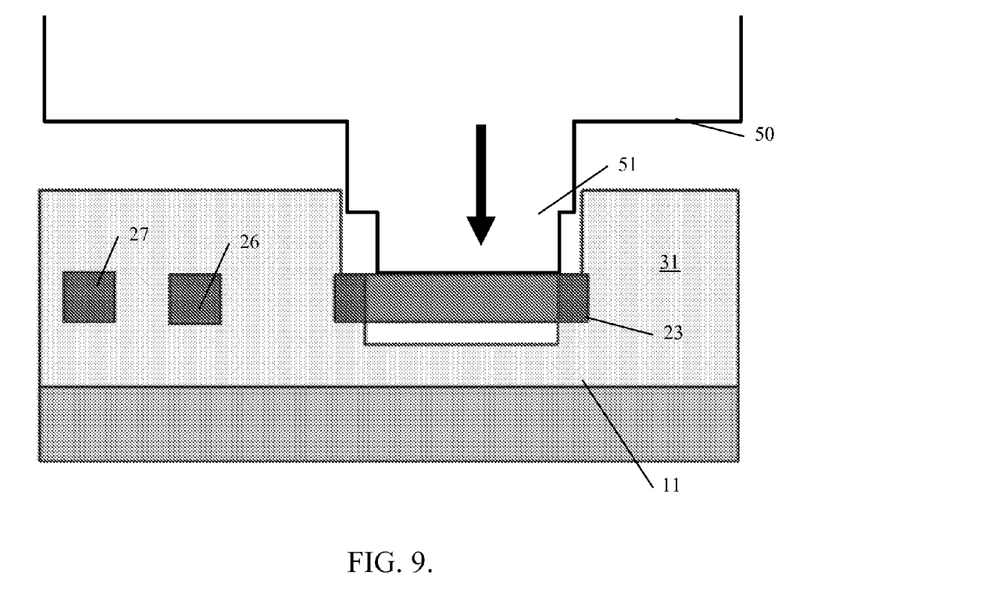
Figure 10:
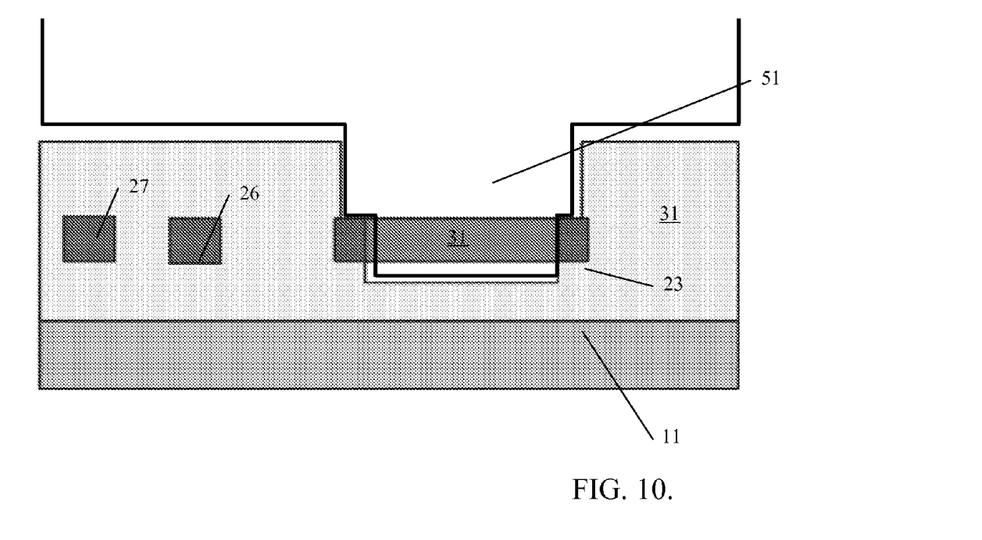
Figure 11:
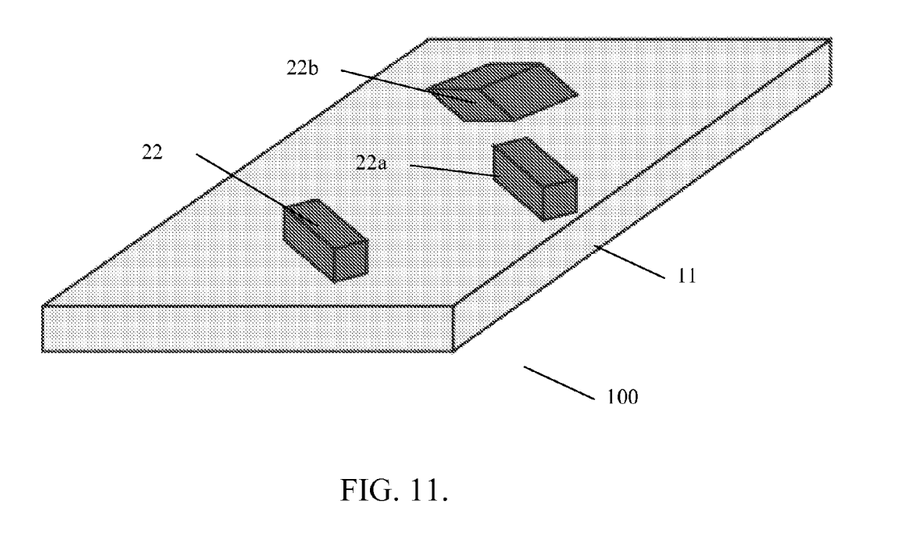
FIGS. 11-16 schematically depict a method for fabricating mirrors embedded in a polymer optical waveguide, according to another embodiment of the disclosure.
Figure 12:
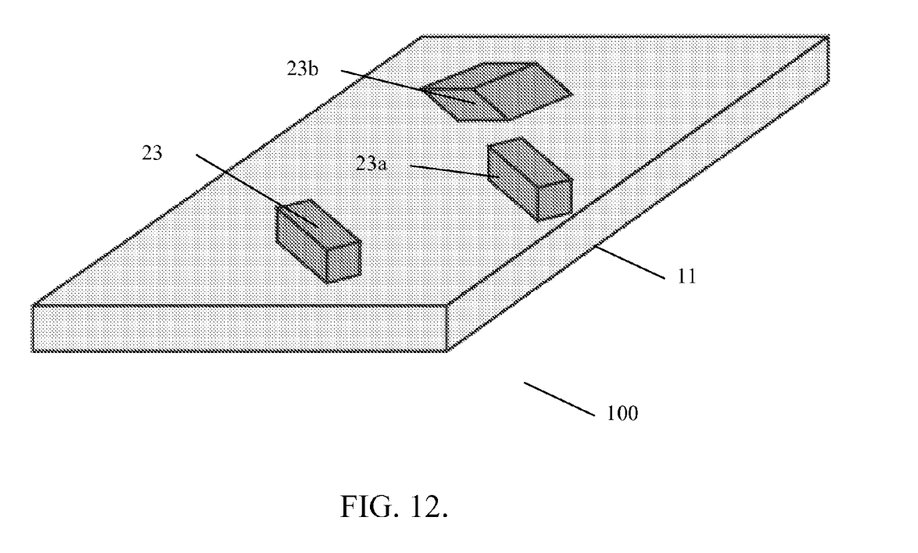
Figure 13:
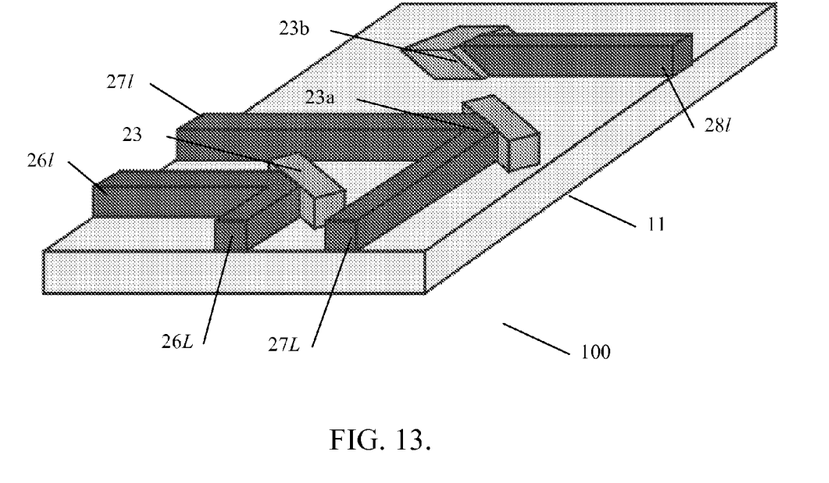
Figure 14:
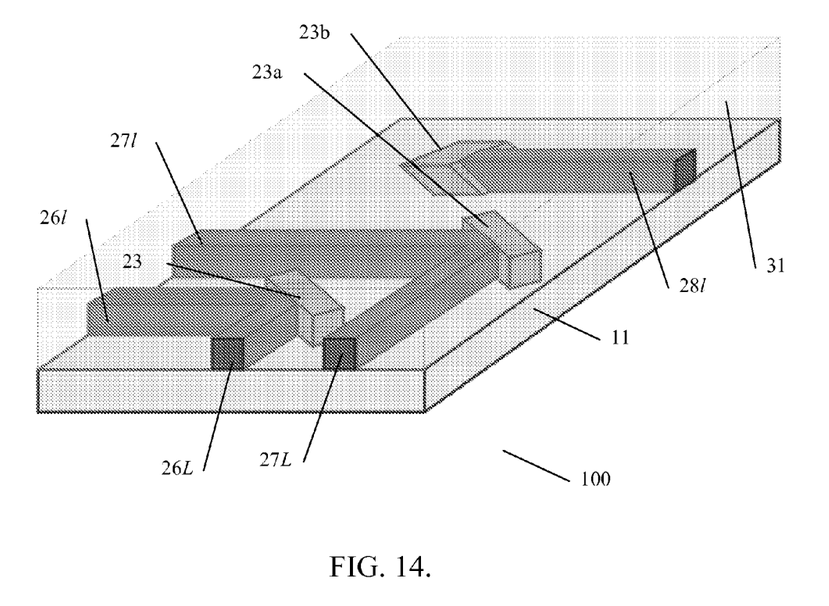

The external component 50 (see FIG. 9) to assemble may for instance be an optical sub-assembly containing one or more alignment studs. In FIGS. 9-10, which are sectional views corresponding to FIG. 7, only one such stud 51 is depicted. As suggested in the drawings, the stud 51 is mounted onto the optical waveguide body. The alignment studs mate with the marker 23, see FIG. 10, thereby providing an accurate alignment. Accordingly, the assembly of the optical sub-assembly 50 together with the polymer waveguide 100 can be accurately achieved in a "passive" manner, without requiring complex in-situ monitoring.

The same approach can be used for any kind of optical module (subassembly), be the optical path vertical or horizontal. This approach can also be used for the alignment of elements such as optical connectors. The connector then acts as connection to another passive or active optical element.

Next, as mentioned too, the light-reflecting feature 23 can be fabricated as a micro-mirror, for optically connecting waveguides, rather than a marker. Notwithstanding, it is a priori not excluded to use a same light-reflecting feature both as a mirror and as a marker.

Accordingly, another embodiment of the present disclosure is now described, in reference to FIGS. 11-16.

Basically, the same steps of fabrication of the core layer 21 (i.e., the open structures formed by reflecting features and waveguide cores), and application of the upper cladding can be contemplated here, except that that the light-reflecting features are now designed as mirrors for optically connecting to waveguides. In this regard, the shape of the light-reflecting features should be conveniently adapted to the object discussed now. Convenient dimensions and shapes for micro-mirrors are known; they partly depend on the material used therefor.

Once a convenient patterning scheme has been adopted, the mirrors and waveguides can be fabricated by applying respective polymerizable layers on the lower cladding and then patterning the desired features, just as described earlier. Preferably, mirrors are here again patterned and then metallized before actually patterning the waveguide cores.

The metallization process of the mirrors can be exactly the same as described in reference to FIGS. 1-4. Thus, the metallized micro-mirrors can be directly fabricated and integrated in the polymer optical layer.

Accordingly, FIGS. 11-14 closely correspond to FIGS. 1-4, except that:

the light-reflecting features (22, 22a, 22b-23, 23a, 23b) are now patterned as mirrors, conveniently located and oriented such to subsequently enable light-redirection from one waveguide to the other; and a waveguide core is typically patterned as waveguide legs (26L to 28l), possibly oriented with acute angle with respect to another (see e.g., 27l and 27L). The leg ends are patterned directly to the mirrors, subject to tolerances, which can be refined as a trial and error process.

The geometries of the waveguide legs here obtained allow for satisfying hard constraints caused by the routing schemes. In this regards, the corresponding patterning schemes are designed upstream the steps described here. These schemes are assumed valid; the patterns depicted in the appended drawings are merely chosen for the sake of explanation. Similarly, the features represented are not necessarily to scale.

In FIGS. 11-14, in-plane mirrors 23, 23a are contemplated. Out-of-plane mirrors (e.g. mirrors 23b in FIGS. 11-14 and/or 23c in FIG. 15) can further be designed. Correspondingly, the fabrication of the waveguides 26-28 may comprise patterning some of the waveguides in-plane (e.g. 28l in FIG. 15) and some others out-of-plane (with respect to an average plane parallel to e.g. the lower cladding), see for instance the waveguide 28o in FIG. 15.

Interestingly, out-of-plane mirrors and waveguides allow for layer change and vertical optical paths. Thus, some of the mirrors can be designed in-plane (corners), to replace the waveguide bends, while some other are out-of-plane, to enable the optical connection between optical waveguide layers. This enables more versatile routing of the optical path.

This further significantly extends the functionalities of the polymer waveguide 100 obtained. In particular, an increased number of available building blocks is possible. Therefore, the design possibilities are markedly extended. In addition, embodiments such as described herein also enables versatile ways of coupling light into and out from the optical channels.

Figure 15:
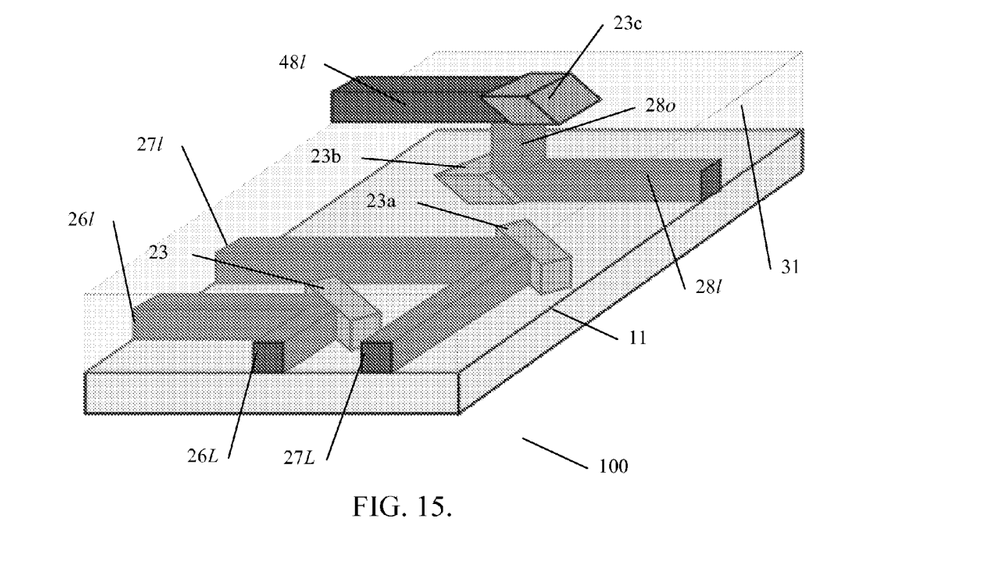
Figure 16:
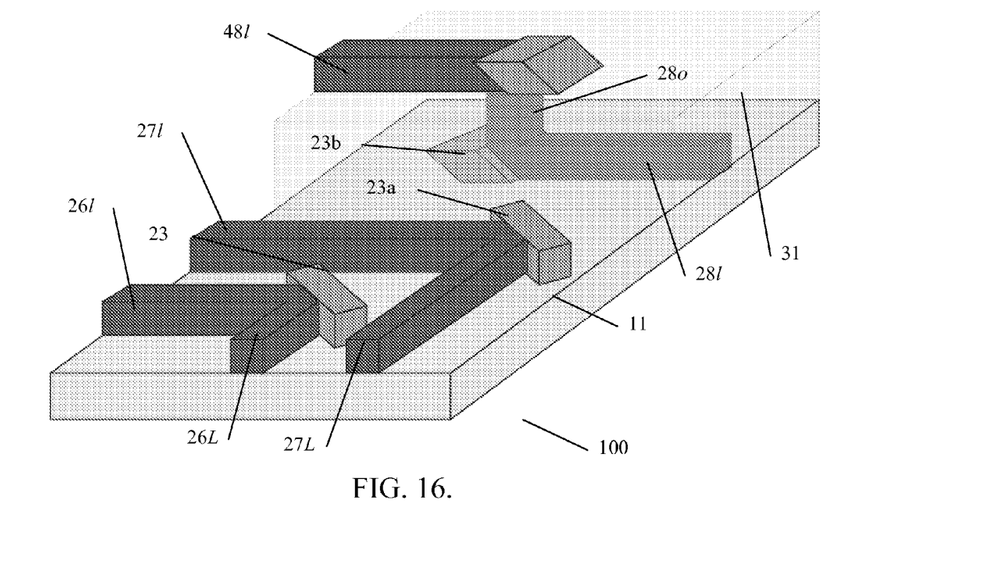

Finally, FIG. 16 depicts the same as in FIG. 15, except that the upper cladding 31 is partially represented, in order to better appreciate the relative positioning of the depicted elements.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims. For example, much more complex designs of waveguides can be contemplated. Furthermore, the skilled person shall appreciate that markers may have other convenient shapes than those depicted in FIGS. 1-10. As another example, and although it has mostly been described a polymer optical waveguide, the skilled person may appreciate that other types of optical waveguides, e.g., glass-like, ceramic-like, can be contemplated.

The invention claimed is:

1. A method for fabricating an optical waveguide, the method comprising:
setting, on a lower cladding of an optical waveguide, a light-reflecting feature;
positioning at least one waveguide core distinct from the reflecting feature on the lower cladding at a location determined with respect to the light-reflecting feature;
applying an upper cladding embedding both the light-reflecting feature and the waveguide core;
uncovering the light-reflecting feature from the upper cladding; and
aligning the optical waveguide with an external component by physically mating the light-reflecting feature to an alignment stud of the external component.

2. The method according to claim 1, wherein setting the light-reflecting feature comprises:
applying a polymerizable layer on the lower cladding;
patterning the applied polymerizable layer to obtain a body for the light-reflecting feature; and
depositing a light-reflecting layer on the patterned body to obtain the light-reflecting feature.

3. The method according to claim 2, wherein depositing the light-reflecting layer comprises:
applying a pre-plate catalyst selectively on the body; and
plating a metal depositing on the selectively applied catalyst.

4. The method according to claim 3, wherein applying the pre-plate catalyst comprises:
selectively activating a surface of the body by applying selectivity-enabling molecules, which bond onto the surface of the body and not substantially onto a surface of the lower cladding; and
depositing the pre-plate catalyst, the catalyst subsequently adsorbing onto the surface of the body via the selectivity-enabling molecules.

5. The method according to claim 4, wherein:
the selectivity-enabling molecules comprise amine-groups, adapted to bond with ligand groups of the surface of the body; and
the catalyst comprises a noble metal complex; and
the metal is provided as an electroless plating bath.

6. The method according to claim 1, wherein setting the waveguide core comprises:
applying a polymerizable layer on the lower cladding; and
patterning the waveguide core in the applied polymerizable layer.

7. The method according to claim 1, wherein the light-reflecting feature is fabricated as one or more of:
a marker for subsequently assembling the waveguide with an external component; and
a micro-mirror for enabling subsequent optical connection of a waveguide core.

8. The method according to claim 7, wherein the light-reflecting feature is fabricated as a marker, the method further comprising:
laser ablation of the upper cladding for uncovering the marker.

9. The method according to claim 8, further comprising:
assembling the waveguide with the external component, based on mechanical match of the marker with a counterpart in the external component.

10. The method according to claim 7, wherein the light-reflecting feature is fabricated as a micro-mirror and the waveguide core is set by:
   applying a polymerizable layer on the lower cladding; and
   patterning the waveguide core in the applied second layer, so as to optically connect it to the micro-mirror.

11. The method according to claim 10, wherein patterning the at least one waveguide core further comprises:
   patterning a first waveguide core in-plane; and
   patterning a second waveguide core out-of-plane, so as to optically connect both first and second waveguide cores via the micro-mirror.

12. The method according to claim 1, further comprising:
   using the waveguide as a new lower cladding for a multi-layer optical waveguide; and
   repeating setting the waveguide core and applying an upper cladding, such that a new upper cladding embeds an additional waveguide core.

13. An optical waveguide, comprising:
   a lower cladding;
   a light-reflecting feature on the lower cladding;
   at least one waveguide core positioned on the lower cladding at a location determined with respect to the light-reflecting feature; and
   an upper cladding polymer embedding both the light-reflecting feature and the waveguide core, wherein the upper cladding polymer is removed to uncover the light-reflecting feature;
   wherein the light-reflecting feature physically mates to an alignment stud of an external component to provide alignment of the optical waveguide with the external component.

14. The optical waveguide according to claim 13, wherein:
   the embedded light-reflecting feature is a marker, not connected to the waveguide core, and configured to allow for mechanical assembly with a counterpart of the external component.

15. The optical waveguide according to claim 13, wherein:
   the embedded light-reflecting feature is a micro-mirror optically connecting to the at least one waveguide core.

* * * * *